United States Patent [19]

Naylor et al.

[11] 4,107,236

[45] Aug. 15, 1978

[54] HYDROGENATED BLOCK COPOLYMERS CONTAINING A BLOCK DERIVED FROM LOW VINYL POLYBUTADIENE AND A BLOCK DERIVED FROM MEDIUM VINYL POLYBUTADIENE

[75] Inventors: Floyd E. Naylor; Robert P. Zelinski, both of Bartlesville, Okla.

[73] Assignee: Phillips Petroleum Company, Bartlesville, Okla.

[21] Appl. No.: 656,770

[22] Filed: Feb. 9, 1976

[51] Int. Cl.² ............................................. C08F 293/00
[52] U.S. Cl. ....................................... 260/879; 526/21
[58] Field of Search ............................. 260/880 B, 879; 526/335, 337

[56] References Cited

U.S. PATENT DOCUMENTS

| | | | |
|---|---|---|---|
| 3,670,054 | 6/1972 | DeLaMare | 260/80 |
| 3,686,365 | 8/1972 | Sequeira | 260/880 B |
| 3,700,748 | 10/1972 | Winkler | 260/880 B |
| 3,830,880 | 8/1974 | DeLaMare | 260/879 |
| 3,840,493 | 10/1974 | Marrs | 260/880 B |

*Primary Examiner*—Paul R. Michl

[57] ABSTRACT

Polymers are prepared containing a hydrogenated block derived from low vinyl polybutadiene, and a hydrogenated block derived from medium vinyl polybutadiene. The polymers further can contain a block derived from a monovinyl-substituted aromatic compound. The polymers are ozone-resistant, thermoplastic elastomers, with improved high temperature tensile strengths.

22 Claims, No Drawings

HYDROGENATED BLOCK COPOLYMERS CONTAINING A BLOCK DERIVED FROM LOW VINYL POLYBUTADIENE AND A BLOCK DERIVED FROM MEDIUM VINYL POLYBUTADIENE

FIELD OF THE INVENTION

The invention relates to thermoplastic elastomers.

BACKGROUND OF THE INVENTION

Increasing costs of monovinyl-substituted aromatic compound monomers, such as styrene, and reduced availability thereof, have created needs for alternatives to the commercially employed hydrogenated butadiene/styrene block copolymers currently of commercial value.

Needed are polymers which either eliminate the monovinyl aromatic compound, such as styrene, or incorporate much reduced amounts of the styrene, and yet produce highly desirable thermoplastic compositions.

Butadiene/high styrene block copolymers, particularly radial block copolymers, have high green tensile values and elongations at room temperature, but these values tend to be reduced as the test temperatures increase. Needed are block copolymers, employing reduced amounts of copolymerized styrene, yet with improved or increased green tensile values, particularly at elevated temperatures.

BRIEF SUMMARY OF THE INVENTION

Our novel copolymers are hydrogenated radial block copolymers prepared with a block of low vinyl polybutadiene and a block of medium vinyl polybutadiene, wherein the low vinyl blocks are the outwardly extending blocks relative to the medium block. These copolymers can be prepared with a monovinyl-substituted aromatic derived block.

The degree of hydrogenation is that which is sufficient to substantially saturate the olefinic double bonds, and not the aromatic double bonds where present.

The novel polymers of our invention are thermoplastic elastomers, i.e., they possess substantial tensile strength in the absence of curing. These polymers are moldable, and the scrap generated in fabricating various articles from such rubbers can be directly reclaimed and reused without requiring that any degradative or other preparative processing steps be applied to said scrap. The polymers possess substantial tensile strengths, notably so even at an elevated temperature, and their hydrogenated character confers environmental resistance.

DETALED DESCRIPTION OF THE INVENTION

We have discovered that hydrogenated block copolymers exhibit unexpectedly desirable properties when prepared with a low vinyl block of polybutadiene and a medium vinyl block of polybutadiene wherein along each arm of the radial polymer the low vinyl blocks are always positioned outwardly relative to the medium vinyl blocks.

These block copolymers further can contain a block derived from a monovinyl-substituted aromatic compound monomer, and where so prepared, the block derived from the monovinyl-substituted aromatic compound can be on the outer end of the radial polymer, or in between the low vinyl and medium vinyl polybutadiene blocks.

In the polymers according to our invention, the olefinically derived double bonds are substantially saturated, whereas the unsaturation in the aromatic nucleus, where present, is substantially undisturbed.

The polymers and copolymers according to our invention can be represented by several closely related formulae. In the formulae show, B represents a block of polymerized butadiene; Lv represents a low vinyl block; Mv represents a medium vinyl block; H represents that the block is a hydrogenated block; S represents a block derived from styrene or other monovinyl-substituted aromatic compound; Z represents a coupling agent residue; and $a$ represents the number of arms and is at least three in the case of the radial block copolymers according to our invention. In each of the formulae, the polybutadiene block is a hydrogenated block wherein substantially all olefinic double bonds have been reduced. Thus, the novel hydrogenated dual vinyl block copolymers of our invention can be represented by the following formulae:

$(HLvB-HMvB)_{\overline{a}}Z$,

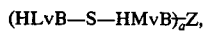

$(HLvB-S-HMvB)_{\overline{a}}Z$, and

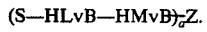

$(S-HLvB-HMvB)_{\overline{a}}Z$.

The novel polymers of our invention can be prepared by the polymerization of suitable monomers is a hydrocarbon diluent with a lithium-based initiator, under solution polymerization conditions, employing appropriate temperatures, pressures, and a vinyl promoter at suitable points in the process, in accordance with the particular polymeric structure desired. After polymerization has been conducted to form each block to the extent suitable to achieve the desired block size and structure, the next monomer is added, and polymerization continued until the particular size and structure of that block is obtained, and so on. Thereupon, without inactivation of the polymerlithium moieties, or termination of polymerization initiation activity, a coupling or branching agent is added which has an effective functionality of at least three, so as to provide the desired radial (branched) structure. Thereafter, the polymer is hydrogenated under conditions effective to substantially reduce the olefinic double bonds, and without affecting substantially the unsaturation in the aromatic structure where such is present in the polymer. The polymer then is recovered, and employed in a variety of utilities such as described.

In preparation of polymers of the type represented by $(HLvB-HMvB)_{\overline{a}}Z$, butadiene is first polymerized under solution polymerization conditions in the absence of a vinyl promoter until a suitable block size has been obtained. At this point, if sufficient butadiene is available remaining unpolymerized, a vinyl promoter can be added and polymerization continued to produce a second polymer block which is of medium vinyl polybutadiene. In actual practice, it is far more convenient to continue polymerization of the first block until substantial completion of the polymerization of available butadiene, at which point a second monomer charge of butadiene and a vinyl promoter is added and polymerization continued until the second charge of monomer had been polymerized. In either case, at this point, the coupling or branching agent can be added to produce the radial branched polymeric structure.

In the radial branched block copolymer structure represented by $(HLvB—HMvB)_aZ$, each block of low vinyl polybutadiene LvB represents a vinyl content before hydrogenation in the area of about 6 to 20 weight percent, and each block of medium vinyl polybutadiene MvB represents a vinyl content before hydrogenation in the range of about 20 to 90 weight percent, such that vinyl content of said medium vinyl block is substantially higher than the vinyl content of the low vinyl block. We presently prefer that each block of HLvB represent a vinyl content before hydrogenation of between about 6 and 12 percent, and that each block of HMvB represent a vinyl content before hydrogenation of between about 35 and 75 percent, more preferred for many purposes 35 to 55 percent, based on the weight of butadiene or butadiene derived units in the polymer. It is much preferred that $a$ = close to 4, and that Z = Si. The presently most useful coupling agent is a silicon tetrahalide, particularly silicon tetrachloride.

Where the $(HLvB—S—HMvB)_{\overline{a}}Z$ or $(S—HLvB—HMvB)_{\overline{a}}Z$ structure is desired the first monomer is either butadiene or a monovinyl-substituted aromatic compound and is polymerized to form a first polymer-lithium. To this is added the alternate monomer not polymerized in forming the first block, thus forming a second block on the first, still-living polymer-lithium moiety. In either case when butadiene is polymerized in either first or second steps, the conditions are such that a low vinyl polybutadiene block is formed. The third polymerization step then forms the block of medium-vinyl polybutadiene and employs a vinyl-promoter. Coupling then forms the branched structure. Hydrogenation then produces the polymers of our invention.

Where the $(HLvB—S—HMvB)_{\overline{a}}Z$ type structure is desired, after polymerization of the initial butadiene charge to produce a low vinyl block, the styrene monomer or other monovinyl aromatic hydrocarbon monomer charge is added and polymerization continued to form the block of polymerized monovinyl aromatic compound, and then without termination a further charge of butadiene is added, polymerization continues in the presence of a vinyl promoter to the extent desired, and then the coupling or branching agent is added.

Similarly, for production of block copolymers of the $(S—HLvB—HMvB)_{\overline{a}}Z$ type, the monomer first charged will be the monovinyl aromatic hydrocarbon monomer which will be polymerized substantially to completion, at which point butadiene will be charged and polymerization continued to form the low vinyl block of polybutadiene, and thereafter a vinyl promoter and preferably with a further monomer charge to permit formation of the high vinyl block of polybutadiene. The addition of the coupling agent then forms the branched block copolymer.

The block copolymers then are hydrogenated to saturate the olefinic double bonds, without to any significant degree reducing the aromatic double bonds, where present.

Monovinyl-Substituted Aromatic Compounds

Monovinyl-substituted aromatic compounds employed as monomers comprise those known to polymerize with monolithium-based initiators. These monomers contain at least 8 carbon atoms per molecule, and while the upper number of carbon atoms does not appear limited as far as operability is concerned, generally available are those of 8 to 20 carbon atoms, more usually 8 to 12 carbon atoms, per molecule, presently preferably the commercially available styrene, as well as various allyl, cycloalkyl, and aryl substituted styrenes such as 4-ethylstyrene, 3-methylstyrene, 4-n-propylstyrene, 4-cyclohexylstyrene, 4-dodecylstyrene, 4-p-tolylstyrene, α-methylstyrene, and the like, as well as halostyrenes such as 2,3-dichlorostyrene, and also such as 1-vinylnaphthalene, 2-vinylnaphthalenes, and the like, as known in the art.

Low Vinyl Polybutadiene Blocks

The vinyl content of the low vinyl blocks of polybutadiene should be in the range of about 6 to 20 weight percent based on total butadiene or butadiene-derived units present in the polymer. The presently preferred range is about 6 to 12 weight percent. While we do not wish to be bound by theoretical considerations, it is believed that these low vinyl values are such that, after hydrogenation, the polymeric blocks will be resinous resembling polyethylene. These resinous outward blocks then can participate in the formation of resinous domains which, acting in the manner of physical rather than chemical crosslinks, provide a network structure without curing, thus affording thermoplatic elastomeric performance.

Medium Vinyl Polybutadiene Blocks

The vinyl content of the medium vinyl polybutadiene blocks should be substantially higher than the vinyl content of the low vinyl blocks, and can be in the range of about 20 to 75 weight percent based on the weight of total butadiene or butadiene-derived units present in the polymer. The difference presently should be at least about 5 weight percent units. The presently preferred medium vinyl range is about 35 to 75 weight percent. While we do not wish to be bound by theoretical considerations, it is believed that these medium vinyl values are such as to provide that, after hydrogenation, the blocks will be elastomeric. As indicated above, low vinyl blocks become resinous upon hydrogenation and, alternatively, going beyond medium vinyl to high vinyl structure provides resinous character even without hydrogenation. Thus, it is believed by us to be important to avoid either low or high vinyl structure in the blocks shown in the above formulae as being medium vinyl in structure.

Relative Block Size

In setting forth the relative block length, values are based on parts by weight per 100 parts of monomer, phm. Broadly, our invention encompasses block copolymers wherein the blocks derived from the monovinyl aromatic compound represent between 0 and about 50 weight percent of the block copolymer, the hydrogenated blocks derived from low vinyl polybutadiene will represent about 0.1 to 50 weight percent, and the hydrogenated blocks derived from medium vinyl polybutadiene will represent about 1 to 99 weight percent. Of course, the total of the polymer itself will be 100 in any case, neglecting as insignificant the residue from the coupling agent.

Presently preferred for structures of $(S—HLvB—HMvB)_{\overline{a}}Z$ is a polystyrene content of about 10 to 35 weight percent, a hydrogenated low vinyl butadiene-derived block of about 2 to 10 weight percent, and a hydrogenated medium vinyl polybutadiene-derived block of about 65 to 88 weight percent, and these ranges are preferred because they are consistent with good thermoplastic elastomeric performance.

In structures represented by (HLvB—HMvB$)_{\overline{a}}$Z, the presently preferred relative block ranges are about 35 to 55 weight percent hydrogenated low vinyl-derived block, and about 65 to 45 weight percent hydrogenated medium vinyl-derived block, and these ranges are preferred because they are consistent with good thermoplastic elastomeric performance.

Presently preferred weight percent ranges for structures represented by (HLvB—S—HMvB$)_{\overline{a}}$Z are the same as described above for (S—HLvB—HMvB$)_{\overline{a}}$Z.

Molecular Weight Ranges

The weight average moleculr weight values for our polymers, before or after coupling, can range widely, so long as the polymers after coupling are considered or characterized as substantially solid polymeric compositions. A broad range before coupling would be of the order of about 10,000 to 250,000, presently preferred about 25,000 to 100,000. These ranges are recommended because they should provide good thermoplastic elastomeric performance. After coupling, an exemplary broad range would be of the order of about 50,000 to 750,000 presently preferred about 80,000 to 300,000. These ranges are recommended because they should provide good thermoplastic elastomer performance. Hydrogenation does not of course, substantially affect molecular weight values and determination thereof. The coupling agent residue is ignored as not contributing significantly to the molecular weight of the polymer.

Coupling Agents

Coupling or branching agents employable in preparing our coupled branched radial compositions, and methods of employing same, are known to the art. Any coupling or treating agent effective for coupling a polymerlithium entity in the context of solution polymerization can be usefully employed in our process to prepare our block copolymers, so long as the coupling agent effectively will couple at least three polymer-lithium moieties so as to produce a branched or radial structure with at least three branches or arms radiating from a centralized coupling agent atom or residue.

Among the useful coupling or treating agents are the multivinyl aromatic hydrocarbon compounds. The multivinyl aromatic compounds can be represented by:

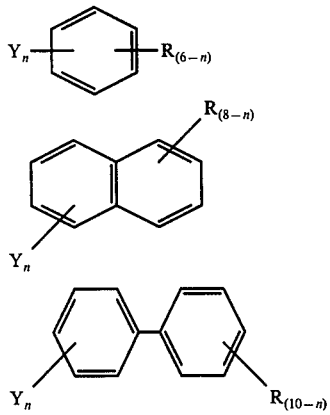

wherein Y is a vinyl group, each R is hydrogen or a lower alkyl with the total of the alkyl substituents containing not more than 12 carbon atoms, and $n$ is 2 or 3. By lower alkyl we mean alkyl groups containing from 1 to 4 carbon atoms. The substituents in the above Formulas (b) and (c) can be on either or both rings. Examples of suitable multivinyl aromatic compounds include divinylbenzene, 1,2,4-trivinylbenzene, 1,3-divinylnaphthalene, 1,8-divinylnaphthalene, 1,3,5-trivinylnaphthalene, 2,4-divinylbiphenyl, 3,5,4'-trivinylbiphenyl, 1,2-divinyl-3,4-dimethylbenzene, 1,5,6-trivinyl-3,7-diethylnaphthalene, 1,3-divinyl-4,5,8-tributylnaphthalene, 2,2'-divinyl-4-ethyl-4'-propylbiphenyl, and the like. The divinyl aromatic hydrocarbons containing up to 26 carbon atoms are preferred, particularly divinylbenzene in either its ortho, meta, or para isomer. Commercial divinylbenzene which is a mixture of isomers is quite satisfactory. It is recognized that such as divinylbenzene, because of the polymerizable character of the vinyl

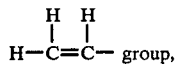

has an effective functionality greater than 2, and that it can and does react with polymer-Li moieties to result in branching to form radial branched structures; and this principle applies generally to the multivinyl compounds.

Other types of treating agents which can be used include the multiepoxides, multiisocyanates, multiimines, multialdehydes, multiketones, multianhydrides, multiesters, multihalides and the like. These compounds can contain two or more types of functional groups such as the combination of epoxy and aldehyde groups of isocyanate and halide groups.

While any multiepoxide can be used, we prefer those which are liquid since they can be readily handled and form a relatively small nucleus for the radial polymer. Especially preferred among the multiepoxides are the epoxidized hydrocarbon polymers such as epoxidized liquid polybutadiene and the epoxidized vegetable oils such as epoxidized soybean oil and epoxidized linseed oil. Other epoxy compounds such as 1,2,5,6,9,10-triepoxydecane, and the like can also be used.

The multiisocyanates preferably are those compounds represented by the formula R'(NCO)$_m$ where R' is a polyvalent organic radical which can be aliphatic, cycloaliphatic, or aromatic and contains from 2 to 30 carbon atoms and $m$ is an integer of 3 or more, preferably 3 to 5, more preferably 3 or 4. Examples of such compounds include benzene-1,2,4-triisocyanate, naphthalene-1,2,5,7-tetraisocyanate, triphenylmethane-triisocyanate, naphthalene-1,3,7-triisocyanate, and the like. Especially suitable is a commercially available product known as PAPI-1. This material is a polyarylpolyisocyanate having an average of 3 isocyanate groups per molecule and an average molecular weight of about 380. Structurally the compound can be represented by a series of isocyanate-substituted benzene rings joined through methylene linkages.

The multiimines which are also known as multiaziridinyl compounds are preferably those containing 3 or more aziridine rings as represented by the formula:

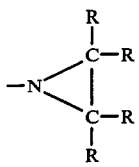

wherein each R can be hydrogen, alkyl, aryl or cycloalkyl radicals or composites of these hydrocarbon radicals, the total of the R groups containing up to 20 carbon atoms. The aziridine rings can be attached to a carbon, phosphorus or sulfur atom. Examples of these compounds are the triaziridinyl phosphine oxides or sulfides such as tri(1-aziridinyl)phosphine oxide, tri(2-methyl-1-aziridinyl)phosphine oxide, tri(2-ethyl-3-decyl-1-aziridinyl)phospine sulfide, tri(2-phenyl-1-aziridinyl)phosphine oxide, tri(2-methyl-3-cyclohexyl-1-aziridinyl)phosphine sulfide, and the like. Also suitable are the triaziridinyl substituted triazines, and the triphosphatriazines containing 3, 4, 5 or 6 aziridinyl substituted rings. Examples of these compounds include 2,4,6-tri(aziridinyl)1,3,5-triazine, 2,4,6-tri(2-methyl-1-aziridinyl)-1,3,5-triazine, 2,4,6-tri(1-aziridinyl)2,4,6-triphospha-1,3,5-triazine, 2,4,6-tri(2-methyl-n-butyl-aziridinyl)2,4,6-triphospha-1,3,5-triazine and the like.

The multialdehydes are represented by compounds such as 1,4,7-naphthalene tricarboxyaldehyde, 1,7,9-anthracene tricarboxyaldehyde, 1,1,5-pentane tricarboxyaldehyde and similar multialdehyde-containing aliphatic and aromatic compounds. The multiketones can be represented by compounds such as 1,6-hexandial-3-one, 1,4,9,10-anthracenetetrone, 2,3-diacetonylcyclohexanone, and the like. Examples of the multianhydrides include pyromellitic dianhydride, styrene-maleic anhydride copolymer, and the like. Examples of the multiesters are the triethyl ester of 1,3,5-benzenetricarboxylic acid, triethyl citrate, and similar compounds.

Other treating agents include the monohydric alcohol esters of dicarboxylic acids. The diesters of suitable type are those in which the carbonyl group of the acid in which the ester is prepared is directly attached to a carbon atom, and preferably the two carboxyls are attached to carbon-to-carbon bonds only. Various hetero atoms can be along the carbon atoms of the carboxylic acid chain, though the hydrocarbon carboxylic acid-derived esters are preferred. Among the useful acids for such diesters are oxalic, malonic, succinic, adipic, suberic, itaconic, maleic, fumaric, glutaric, pimelic, sebacic, phthalic, terephthalic, diphenic, isophthalic, naphthalic, and the like. The monohydric alcohols useful in making the esters include such as methyl, n-propyl, n-butyl, tert-butyl, hexyl, phenol, ethyl, isopropyl, sec-butyl, amyl, octyl, cresol, and the like. Typical esters include such as dimethyl oxalate, dipropyl malonate, dihexyl pimelate, diethyl adipate, dimethyl phthalate, diethyl oxalate, dibutyl glutarate, dimethyl adipate, dioctyl sebacate, diethyl terephthalate, and the like.

Among the multihalides, we presently prefer the silicon tetrahalides such as silicon tetrachloride, silicon tetrabromide and silicon tetraiodide and the trihalosilanes such as trifluorosilane, trichlorosilane, trichloroethylsilane, tribromobenzylsilane, and the like. Another useful type is the stannic compounds such as the stannic halides such as stannic chloride. Another preferred group is the multihalogen substituted hydrocarbons such as 1,3,5-tri(bromoethyl)benzene, 2,5,6,9-tetrachloro-3,7-decadiene, and the like, in which the halogen is attached to a carbon atom which is alpha to an activating group such as an ether linkage, a carbonyl group, or a carbon-to-carbon double bond. Substituents which are inert with respect to lithium atoms in the terminally reactive polymer can also be present in the active halogen-containing compounds. Alternatively, other suitable reactive groups different from the halogen as described above can be present. Examples of compounds containing more than one type of functional group include 1,3-dichloro-2-propanone, 2,2-dibromo-3-decanone, 3,5,5-trifluoro-4-octanone, 2,4-dibromo-3-pentanone, 1,2,4,5-diepoxy-3-pentanone, 1,2,4,5-diepoxy-3-hexanone, 1,2,11,12-diepoxy-8-pentadecanone, 1,3,18,19-diepoxy-7,14-eicosanedione, and the like.

It can be seen from the above description of suitable polyfunctional compounds that a vast number of possible reagents are available. In general, the compounds are organic or, in the case of the silicon halides, have a silicon base. They are liquids and/or have relatively low molecular weights for example, less than 2,000. Also the compounds are relatively free of other reactive groups which would compete with the groups named above for reaction with the lithium-carbon bond. One equivalent of treating agent is the optimum amount for maximum coupling or branching. Larger amounts encourage the production of polymers containing terminally reactive groups instead of coupling, or coupling instead of branching. When equivalent means of treating agent and lithium-containing polymer are employed, the final product comprises a polymer in which the polymer chain is joined at one end to each reactive site of the treating agent.

A choice of coupling or treating agent directly reflects itself in the composition of the resulting polymer, since the choice of coupling agent determines the radial nucleus Z and the value of a equal to the effective functionality of the coupling agent.

Polymerization Conditions

The block copolymers of our invention are prepared by contacting the monomer with a hydrocarbon monolithium initiator. Any of the hydrocarbon monolithium initiators known in the solution polymerization arts can be employed. Typically these are represented by RLi wherein R is the hydrocarbon radical. These hydrocarbon radicals can be aliphatic, cycloaliphatic, or aromatic, containing at least one carbon atom per molecule. The number of carbon atoms and consequently the molecular weight of the hydrocarbon lithium initiator is not limited by operability. Those of up to 20 carbon atoms are most commonly employed, though higher molecular weight initiators can be used. Most frequently employed are the aliphatic monolithium types. If an n-alkyllithium initiator is employed, it sometimes is advisable to add a minimal amount of a polar compound, such as tetrahydrofuran, to increase initiator efficiency. The presently preferred species is sec-butyllithium for ready availability. Exemplary species include n-butyllithium, sec-butyllithium, n-decyllithium, phenyllithium, naphthyllithium, p-tolyllithium, cyclohexyllithium, eicosyllithium, and the like.

Such hydrocarbyl monolithium initiators are employed in an amount effective for polymerization of the monomer charge employed to the molecular weight desired. Typically, an exemplary amount would be such as about 0.25 to 10 mhm, millimoles per 100 grams of monomer. A presently preferred range is about 1 to 4 mhm, because it is consistent with obtaining polymers of presently preferred molecular weight ranges for branching.

Polymerization is conducted by contacting the monomer with the lithium initiator in a diluent. Diluents employed for the purpose are any of the paraffinic, cycloparaffinic, or aromatic hydrocarbons known to the art, alone or in admixture, typically those of 4 to 10 carbon atoms per molecule. Exemplary species include n-heptane, cyclohexane, n-hexane, benzene, toluene, the xylenes, 2,2,4-trimethylpentane, and the like, alone or in admixture. Cyclohexane currently is commercially preferred for ease of handling, high solubility of polymer, and availability.

Polymerization can be carried out at any convenient temperature employed in the solution polymerization arts. Suitable and exemplary temperatures lie in the range of from less than about 0° to +200° C. or more, presently preferred about 40° to 100° C., for each step, since these temperatures are consistent with obtaining the desired polymer. The pressures employed can be as convenient, and preferably are pressures sufficient to maintain monomers and diluents substantially in the liquid phase. The polymerization times can vary widely as may be convenient, and will, of course, be affected by polymerization temperatures chosen. Times suitable should be chosen, for each step, such that substantially complete polymerization is obtained, or substantially complete coupling, as the case may be.

In preparing the low vinyl block of polybutadiene, conditions should be such as to avoid the presence of vinyl-inducing agents. Thus, where styrene is polymerized first, and thereafter butadiene is added to produce a low vinyl block, and a minimal amount of an initiator promoter such as tetrahydrofuran can be added to promote the polymerization of the styrene, it is important that this minimal amount be less than that which would act to increase the vinyl content of this desired first low vinyl block of polybutadiene. With tetrahydrofuran, a desirable concentration range is about 0.01 up to less than about 0.1 part by weight per hundred parts monomer.

The medium vinyl polybutadiene block can be readily obtained by employing a small amount of a polar material as a vinyl promoter. The vinyl promoter conveniently is added to the hydrocarbon diluent at the appropriate time in the polymerization sequence. These promoters can be selected from ethers and tertiary amines.

Exemplary species include the presently preferred tetrahydrofuran, as well as 1,2-dimethoxyethane, dimethyl ether, diethyl ether, methyl ethyl ether, ethyl propyl ether, di-n-propyl ether, di-n-octyl ether, anisole, dibenzyl ether, diphenyl ether, dimethylethylamine, tri-n-propylamine, tri-n-butylamine, trimethylamine, triethylamine, N,N-dimethylaniline, N-ethylpiperidine, N-methyl-N-ethylaniline, N-methylmorpholine, N,N,N',N'-tetramethylethylenediamine, and the like. The amount of polar compound employed will vary widely with the choice of vinyl promoter, but should be that amount necessary to promote the degree of vinylization desired. An exemplary amount would be in the range of about 0.1 to 25 parts by weight per hundred parts monomer.

At the conclusion of the polymerization steps, the coupling or branching agent is added to the unquenched reaction mixture. This agent must be added before any material such as water, acid or alcohol is added to inactive and/or remove the lithium atoms present in the polymer. The temperature of this reaction can vary over a broad range and conveniently can be the same as used for the polymerization. Ordinarily the higher temperatures are preferred for this reaction for example, from room temperature up to about 120° C. and above. Temperatures above about 35° C. are preferred for rapid reaction. Under such conditions, the reaction normally occurs as soon as the materials are blended and the time is quite short, for example, in the range of about 1 minute to 1 hour. Longer reaction periods are required at the lower temperatures. The branching agent can be added by a variety of modes, for example a substantial portion can be added batchwise initially with the balance being added in smaller increments or essentially continuously.

Hydrogenation

The branched polymers can be hydrogenated by means known in the art. The hydrogenation procedure employed should be effective so as to substantially reduce olefinic unsaturation, while leaving essentially untouched aromatic unsaturation present in the styrene or other monovinyl aromatic hydrocarbon monomer, where employed.

Hydrogenation can be conducted by means known in the art for this purpose. Particularly favorable hydrogenation catalysts comprise reaction products of aluminum alkyl compounds with either nickel or cobalt carboxylates or alkoxides. Typical of the aluminum alkyl compounds are such as triisobutylaluminum, triethylaluminum, tri-n-propylaluminum, and the like.

Exemplary nickel or cobalt carboxylates or alkoxides include the nickel and cobalt acetates, propionates, benzoates, octoates, and the butoxides, ethoxides, isopropoxides, and the like.

Exemplary hydrogenation conditions include hydrogenation in a hydrocarbon diluent, and hydrogenation can be conducted, if desired in the polymerization diluent. Exemplary temperatures are in the range of about 25° to 175° C.; pressures can range up to about 1000 psig, and times range from 30 minutes to 4 hours or more.

By effective selective hydrogenation, wherein substantially complete reduction of olefinic double bonds is obtained, the reduction of at least about 90 percent of the olefinic double bonds, without reducing more than about 10 percent of the aromatic unsaturation.

After hydrogenation, the polymer can be recovered by means known in the art, such as coagulation in isopropyl alocohol, and compounded as necessary.

EXAMPLES

Examples provided are designed to further an understanding of our invention, without limiting the scope thereof. Particular species employed, particular conditions, amounts of materials, are designed to be exemplary, and not limitative.

EXAMPLE I

A series of hydrogenated (S—HLvB—HMvB)$_a$Z radial block copolymers were synthesized in accordance with the following recipe. The value of $a$ is believed to be effectively from 3 to 4 in view of the conditions employed, and Z is silicon. The results of polymer property determinations appear in Table I.

| Recipe[a] | |
|---|---|
| Step 1 | phm[b] |
| Cyclohexane | 390 |
| Styrene | Variable |
| sec-Butyllithium | Variable |
| Temperature, °C.[c] | 70 |
| Time, minutes | 20 |
| Step 2 | |
| Butadiene | Variable |
| Time, minutes | 45 |
| Step 3[d] | |
| Butadiene | Variable |
| Cyclohexane | 390 |
| Tetrahydrofuran | 5 |
| Time, minutes | 30 |
| Step 4[e] | |
| Silicon tetrachloride | Variable |
| Time, minutes | 10 |
| Step 5 | |
| Catalyst[f] | 5 mhm[g] |
| Hydrogen pressure | 50 psig |
| Time, hours | 2 |

[a]Charge order was order of listing in recipe.
[b]Parts by weight per hundred parts monomer.
[c]All steps (including steps 4 and 5) employed 70° C. reaction temperature.
[d]The step 3 reagents were mixed with 0.3 mhm of n-butyllithium and the combination was tumbled for 10 minutes at 70° C. for scavenging of impurities prior to charging to the polymerization mixture.
[e]Silicon tetrachloride charge was based on the effective level of sec-butyllithium initiator. After the first increment of SiCl$_4$, 75 wt. % of stoichiometric, was added, the mixture was stirred for 5 minutes. The second increment, 50 wt. % of stoichiometric, then was added dropwise with stirring over a 5 minute period.
[f]The hydrogenation catalyst was preformed by the addition of 0.5M triethylaluminum in cyclohexane to 6 wt. % nickel octoate in a paraffinic hydrocarbon to afford a molar ratio of 2 triethylaluminum/1 nickel octoate.
[g]mhm: millimoles per 100 parts monomer by weight.

The polymerizations and hydrogenations were carried out in glass one-half gallon reactors. As indicated in the above recipe Steps 1, 2, 3 and 4 accomplished, respectively: formation of the polystyrene block, formation of the low-vinyl polybutadiene block LvB, formation of the medium-vinyl polybutadiene block MvB and branching with silicon tetrachloride. After each of the Steps 2, 3 and 4, a small sample for evaluation was withdrawn, a commonly used stabilizer 1 phm 2,6-di-t-butyl-4-methylphenol in solution in equal parts by volume of toluene and isopropyl alcohol was added, the polymer was coagulated in isopropyl alcohol, collected on a filter and volatiles removed at reduced pressure. Properties of these unhydrogenated or parent polymers are shown in Table II. Following Step 4, the balance of the polymer solutions was hydrogenated in accordance with Step 5 as indicated above. Such hydrogenation removes most or essentially all of the unsaturation in the butadiene units but essentially none of the unsaturation, i.e., the aromatic rings, of the styrene units. Evaluation of the hydrogenated polymer followed as indicated by results shown in Table I.

TABLE I

Properties of Polymers, Inventive and Control

| Run No. | Sec-BuLi[a] mhm | S/HLvB/HMvB[b] phm | Tensile, psi[c] 26° C. | Tensile, psi[c] 70° C. | Elongation, %[c] 26° C. | Elongation, %[c] 70° C. | Perm.[d] Set | Melt[e] Flow | Shore A[f] Hardness |
|---|---|---|---|---|---|---|---|---|---|
| 1 | 1.8 | 10/10/80 | 1800 | 150 | —[h] | 200 | — | 4.5 | — |
| 2 | 1.2 | 10/20/70 | 2400 | 240 | — | 200 | — | 1.8 | — |
| 3 | 1.8 | 10/20/70 | 2300 | 300 | — | 300 | — | 0.02 | — |
| 4 | 1.8 | 10/30/60 | 1800 | 360 | — | 200 | — | 0.02 | — |
| 5 | 1.8 | 20/ 0/80 | 1500 | 350 | 500 | 300 | 16 | — | 60 |
| 6 | 1.8 | 20/ 5/75 | 3300 | 580 | 600 | 500 | 27 | — | 66 |
| 7 | 1.8 | 20/10/70 | 2300[g] | 200 | 700 | 400 | 52 | 1.5 | 66 |
| 8 | 1.8 | 20/20/60 | 4000 | 560 | 700 | 500 | 74 | 0.2 | 77 |
| 9 | 1.8 | 20/30/50 | 4000 | 600 | 600 | 500 | 160 | — | 86 |
| 10 | 1.8 | 25/ 0/75 | 2700 | 310 | 600 | 300 | 12 | — | 71 |
| 11 | 1.8 | 25/ 5/70 | 4100 | 820 | 600 | 500 | 36 | — | 76 |
| 12 | 1.8 | 30/ 0/70 | 3300 | 720 | 600 | 400 | 21 | — | 80 |
| 13 | 1.8 | 30/ 5/65 | 3600 | 1170 | 600 | 500 | 46 | — | 85 |
| 14 | 1.8 | 30/10/60 | 2600 | 550 | 600 | 400 | 56 | 0.0 | 79 |
| 15 | 1.8 | 30/20/50 | 3600 | 600 | 500 | 400 | 94 | 0.0 | 87 |
| 16 | 1.8 | 35/ 0/65 | 3900 | 1220 | 500 | 500 | 40 | — | 92 |
| 17 | 1.8 | 35/ 5/60 | 4100 | 1270 | 500 | 500 | 52 | — | 92 |
| 18 | 1.8 | 40/ 0/60 | 4100 | 1490 | 500 | 500 | 68 | — | 96 |
| 19 | 1.8 | 40/ 5/55 | 4000 | 1560 | 500 | 500 | 87 | — | 93 |
| 20 | 1.8 | 45/ 0/55 | 3500 | 1500 | 500 | 500 | 100 | — | 95 |
| 21 | 1.8 | 45/ 5/50 | 3800 | 1580 | 500 | 500 | 120 | — | 97 |

[a]Effective initiator level.
[b]S = polystyrene block,
HLvB = hydrogenated low-vinyl polybutadiene block,
HMvB = hydrogenated medium-vinyl polybutadiene block.
[c]ASTM D 412–66
[d]Permanent set at break, i.e. tensile set, ASTM D 412–66.
[e]Grams/10 min. at 200° C./21.6 Kg weight, ASTM D 1238.
[f]ASTM D 2240–68.
[g]The gel permeation chromatographic curve indicated this polymer was poorly coupled.
[h]A dash denotes no determination.

TABLE II

Properties of Unhydrogenated or Parent Polymers

| Run[a] No. | After Step 2[b] Trans | After Step 2[b] Vinyl[e] | After Step 2[b] I.V. | After Step 3[c] Trans | After Step 3[c] Vinyl[e] | After Step 3[c] I.V. | After Step 3[c] $M_w$ | After Step 3[c] $M_n$ | After Step 4[d] I.V. | After Step 4[d] $M_w$ | After Step 4[d] $M_n$ |
|---|---|---|---|---|---|---|---|---|---|---|---|
| 1 | — | — | — | — | — | 0.77 | 58 | 47 | 1.33 | 221 | 140 |
| 2 | — | — | — | — | — | 1.00 | 45 | 36 | — | 213 | 134 |
| 3 | — | — | — | — | — | 0.94 | 75 | 61 | 1.00 | 264 | 161 |
| 4 | — | — | — | 33.1 | 34.3 | 0.97 | 74 | 49 | 1.59 | 241 | 85 |
| 5 | (no low-vinyl step) | | | 26.5 | 34.7 | 0.85 | — | — | 1.36 | 196 | 67 |
| 6 | — | — | — | 41.2 | 31.7 | 0.65 | — | — | 1.14 | 218 | 151 |
| 7 | 16.4 | 3.9 | 0.16 | 25.4 | 36.1 | 0.66 | 54 | 45 | 1.07 | 173 | 108 |
| 8 | 27.6 | 4.9 | 0.39 | 27.5 | 33.4 | 0.63 | — | — | 1.17 | 201 | 135 |

TABLE II-continued

| Run[a] | After Step 2[b] | | | After Step 3[c] | | | | | After Step 4[d] | | |
|---|---|---|---|---|---|---|---|---|---|---|---|
| No. | Trans | Vinyl[e] | I.V. | Trans | Vinyl[e] | I.V. | $M_w$ | $M_n$ | I.V. | $M_w$ | $M_n$ |
| 9 | — | — | — | — | — | — | — | — | — | — | — |
| 10 | (no low-vinyl step) | | | 24.7 | 30.9 | 0.59 | — | — | 1.06 | 206 | 143 |
| 11 | — | — | — | 25.6 | 29.3 | 0.59 | — | — | 1.08 | 196 | 136 |
| 12 | (no low-vinyl step) | | | 22.9 | 28.5 | 0.56 | — | — | 0.56 | 184 | 131 |
| 13 | — | — | — | — | — | — | — | — | — | — | — |
| 14 | 13.4 | 2.1 | 0.21 | 23.4 | 32.9 | 0.65 | — | — | 1.14 | — | — |
| 15 | 21.1 | 4.5 | 0.30 | 26.3 | 29.9 | 0.63 | 54 | 40 | — | 194 | 86 |
| 16 | (no low-vinyl step) | | | 21.3 | 34.5 | 0.51 | — | — | 0.94 | 176 | 132 |
| 17 | — | — | — | 23.8 | 33.6 | 0.52 | — | — | 0.96 | 175 | 126 |
| 18 | (no low-vinyl step) | | | 21.2 | 26.4 | 0.48 | — | — | 0.88 | 191 | 131 |
| 19 | — | — | — | 21.2 | 26.4 | 0.50 | — | — | 0.88 | 191 | 138 |
| 20 | (no low-vinyl step) | | | 18.0 | 25.2 | 0.45 | — | — | 0.84 | 173 | 130 |
| 21 | — | — | — | 19.5 | 24.1 | 0.49 | — | — | 0.86 | 176 | 124 |

[a]Example numbers correspond to those of Table I.
[b]Properties after Step 2 shown in recipe. The control runs lack this step of synthesizing a low-vinyl polybutadiene block. Polymer microstructure (wt. % trans, wt. % vinyl) was determined by infrared absorption spectroscopy. Inherent viscosity (I.V.) was determined in accordance with U.S. 3,278,508 column 20 note a, with the modification that tetrahydrofuran was employed in place of toluene and with the further modification that the solution was not filtered through a sulfur absorption tube but rather a sample of the solution was filtered through a fritted glass filter stick of grade C porosity and pressured directly into the viscometer.
[c]Properties after Step 3 shown in recipe. $M_w$ and $M_n$, weight average and number average molecular weights respectively, quoted $\times 10^{-3}$, were determined by gel permeation chromatography in accordance with G. Kraus and C. J. Stacy, 10 J. Poly. Sci. A-2, 657 (1972).
[d]Properties after Step 4 shown in recipe. $M_w$ and $M_n$ quoted $\times 10^{-3}$.
[e]The vinyl values quoted in Table II are those directly as determined. These values apply to the polymer structure as a whole, not to just the butadiene portion. In order to represent specifically the weight percentage of the butadiene units present that are in the vinyl configuration, these values must be "normalized", i.e. corrected for the styrene content. Supplied below are normalized values for four examples from Table II. (The normalized values for the medium vinyl block, i.e. the block generated in Step 3, are obtained by subtracting the contribution of the low vinyl block from the vinyl value determined for the total polymer after Step 3 and dividing that remainder by the fraction of the total polymer that is medium vinyl block to obtain the normalized value for the medium vinyl block.

| Run No. | Wt. % Vinyl in Low Vinyl Block | Wt. % Vinyl in Med. Vinyl Block |
|---|---|---|
| 7 | 11.7 | 49.9 |
| 8 | 9.8 | 52.4 |
| 14 | 8.4 | 53.4 |
| 15 | 11.2 | 55.3 |

Runs 1 to 21, inclusive, illustrate the preparation and properties for a variety of (polystyrene/hydrogenated low vinyl polybutadiene/hyrogenated medium vinyl polybutadiene)$_a$Z radial block copolymers. The weight average molecular weight $M_w$ range for the coupled polymers broadly was about 175,000 to 250,000.

According to the data in the tables above, the low vinyl block resulted in generally increased tensile strength at both test temperatures. The low vinyl block also resulted in generally increased permanent set and hardness values, in general proportion to the length of the low vinyl block. The effects so noted were most pronounced at a relative amount of styrene in the range of about 20 to 30 phm, though were less pronounced at higher styrene levels.

Surprisingly, a comparison of the effects of the different low vinyl block lengths within these polymers in accordance with the data obtained, indicate that even though the same polystyrene content existed, and the length of the low vinyl polybutadiene block varied, the data show that about 5 parts of low vinyl was substantially as effective as higher levels of low vinyl. In general, blocks of low vinyl polybutadiene resulted in considerably improved polymers as compared to the direct control polymers. Of course, improvement could be obtainable, in some instances, by increasing the amount of copolymerized styrene, but this is exactly what is commercially undesirable under present world cost conditions. All polymers in Runs 1–21, inclusive were rubbery.

EXAMPLE II

A series of (HLvB—HMvB)$_a$Z radial block copolymers were synthesized in accordance with the following procedure. The value of $a$ is believed to be effectively from 3 to 4 in view of the conditions employed, and Z is silicon. Polymer property determinations were made at several stages in polymer preparation. The specifics of polymer preparation are given in Table III and the polymer property determination results are given in Table IV.

| Recipe[a] | |
|---|---|
| Step 1 | phm |
| Cyclohexane | Variable |
| Butadiene | Variable |
| sec-Butyllithium | Variable |
| Temperature, ° C. | 70 |
| Time, hours | Variable |
| Step 2[b] | |
| Butadiene | Variable |
| Cyclohexane | Variable |
| Tetrahydrofuran | Variable |
| Temperature, ° C. | 50 |
| Time, hours | 1 |
| Step 3[c] | |
| Silicon tetrachloride | Variable |
| Temperature, ° C. | 70 |
| Time, minutes | 10 |
| Step 4[d] | |
| Catalyst | 5 mhm |
| Hydrogen pressure, psig | 30 – 50 |
| Temperature, ° C. | Variable |
| Time, hours | Variable |

[a]The charge order was the order of listing shown above.
[b]The Step 2 reagent mixture plus n-butyllithium was agitated for 5 minutes at 70° C. for scavenging of impurities prior to charging to polymerization mixture.
[c]Silicon tetrachloride charge was based on the effective level of sec-butyllithium initiator. After the first increment of SiCl$_4$ was added, the combination was stirred 5 minutes and then the second increment was added dropwise with stirring over a 5 minute period.
[d]The hydrogenation catalyst was preformed by the addition of triethylaluminum in cyclohexane to nickel octoate in a paraffinic hydrocarbon in a 2/1 mole ratio of triethylaluminum to nickel octoate.

The basic procedures of Runs 1 through 21, inclusive, were employed for Runs 22 through 26, inclusive.

TABLE III[a]

| | Synthesis of (HLvB/HMvB)$_a$Si | | | | |
|---|---|---|---|---|---|
| Run No. | 22 | 23 | 24 | 25 | 26 |
| Step 1 | | | | | |
| Cyclohexane, phm | 400 | 400 | 400 | 360 | 375 |
| Butadiene, phm | 50 | 37.5 | 31.25 | 50 | 50 |
| sec-BuLi, mhm | 3.125 | 3.125 | 3.125 | 6.875 | 2.875 |
| Time, hrs. | 1.5 | 1.5 | 1.5 | 2 | 1.5 |
| Step 2 | | | | | |
| Butadiene, phm | 50 | 62.5 | 68.75 | 50 | 50 |
| Cyclohexane, phm | 400 | 400 | 400 | 360 | 375 |
| Tetrahydrofuran, phm | 10 | 10 | 10 | 5 | 10 |
| Step 3 | | | | | |
| Silicon tetrachloride, mhm | | | | | |
| first increment | 0.5 | 0.5 | 0.5 | 0.3188 | 0.3125 |
| second increment | 0.25 | 0.25 | 0.25 | 0.2188 | 0.2188 |
| Step 4 | | | | | |
| Temperature, ° C. | 70 | 70 | 70 | 50 | 50 |
| Time, hrs. | 1 | 1 | 1 | 2 | 2 |

[a]Values expressed in phm and those in mhm are based on the sum of the monomer charged in Step 1 plus that charged in Step 2.

TABLE IV

| | Polymer Property Determinations Step by Step | | | | |
|---|---|---|---|---|---|
| Run No. | 22 | 23 | 24 | 25 | 26 |
| Step 1 | | | | | |
| trans | 54.8 | 50.3 | — | 45.8 | — |
| vinyl | 8.4 | 8.1 | — | 8.0 | — |
| I.V. | 0.4 | 0.31 | 0.27 | 0.62 | — |
| $M_w \times 10^{-3}$ | 21 | — | 12.9 | 36 | — |
| $M_n \times 10^{-3}$ | 19 | — | 11.2 | 31 | — |
| Step 2 | | | | | |
| trans | 36 | 30.8 | — | — | — |
| vinyl | 41.3 | 40.9 | — | — | — |
| I.V. | 0.67 | 0.61 | — | 0.90 | — |
| $M_w \times 10^{-3}$ | 47 | — | — | 70 | — |
| $M_n \times 10^{-3}$ | 39 | — | — | 58 | — |
| Step 3 | | | | | |
| trans | 33 | 31.6 | 29.8 | 34.7 | — |
| vinyl | 37.5 | 42.5 | 45.9 | 33.5 | — |
| I.V. | 1.19 | 1.08 | 1.68 | 1.56 | — |
| $M_w \times 10^{-3}$ | 170 | — | 157 | 240 | — |
| $M_n \times 10^{-3}$ | 108 | — | 93 | 137 | — |
| Step 4 | | | | | |
| tensile, psi | 1100 | 700 | 500 | 1900 | 1900 |
| elongation, % | 450 | 300 | 200 | 400 | 700 |

Considering the data summarized in Table IV, the best tensile and elongation values can be observed in Run No. 26. The polymer of Run 26 contained a relatively proportionately long terminal block, and in view of the amount of initiator involved, appeared to exhibit the highest molecular weight. All polymers of Runs 22 to 26, inclusive, were rubbery. These Runs 22 through 26, inclusive, illustrate the formation of (HLvB—HMvB)$_a$Z radial block copolymers.

EXAMPLE III

Several (HLvB—S—HMvB)$_a$Z radial block copolymers were synthesized in accordance with the following recipe. Value of $a$ is believed to be effectively from 3 to 4 in view of the conditions employed, and Z is silicon. The results of polymer property determinations appear in Table V.

| Recipe[1] | |
|---|---|
| Step 1 | |
| Cyclohexane, phm[2] | 390 |
| 1,3-Butadiene, phm | Variable |
| sec-Butyllithium, mhm[3] | 1.85 |
| ° C. | 70 |
| Hrs. | Variable |
| Step 2 | |
| Styrene, phm | Variable |
| ° C. | 70 |
| Hrs. | 0.33 |
| Step 3[4] | |
| Cyclohexane, phm | 390 |
| 1,3-Butadiene, phm | Variable |
| Tetrahydrofuran, phm | 5 |
| n-Butyllithium, mhm | Variable |
| Pretreatment, min./° C. | 10/70 |
| Polymerization, ° C. | 70 |
| Polymerization, hrs. | 0.5 |
| Step 4[5] | |
| 1. Silicon tetrachloride, mhm | Variable |
| Coupling, min./° C. | 5/70 |
| 2. Silicon tetrachloride, mhm | Variable |
| Coupling, min./° C. | 5/70 |
| Step 5 | |
| Catalyst[6], mhm | 5 |
| ° C. | 70 |
| Hrs. | 2 |
| Hydrogen pressure, psig. | 50 |

[1]Charge order employed was the order of listing in recipe.
[2]Parts by weight per hundred parts monomer.
[3]Gram millimoles per hundred grams monomer.
[4]The Step 3 reagents were mixed with n-butyllithium and the combination was tumbled for 10 minutes at 70° C. for scavenging of impurities prior to charging to the polymerization mixture.
[5]The first addition of silicon tetrachloride was as a single slug followed by stirring for 5 minutes at 70° C. The second addition was added dropwise with stirring over a 5 minute period at 70° C.
[6]The hydrogenation catalyst was preformed by the addition of 0.5M triethylaluminum in cyclohexane in 6 wt. % nickel octoate in a paraffinic hydrocarbon to afford a mole ratio of 2 triethylaluminum/1 nickel octoate.

| Run No. | 27 | 28 | 29 |
|---|---|---|---|
| Step 1 | | | |
| 1,3-Butadiene, phm | 5 | 5 | 20 |
| Hours | 0.5 | 0.75 | 1 |
| Step 2 | | | |
| Styrene, phm | 25 | 20 | 5 |
| Step 3 | | | |
| 1,3-Butadiene, phm | 70 | 75 | 75 |
| n-Butyllithium, mhm | 0.32 | 0.3 | 0.28 |
| Step 4 | | | |
| 1. Silicon tetrachloride, mhm | 0.28 | 0.26 | 0.275 |
| 2. Silicon tetrachloride, mhm | 0.14 | 0.13 | 0.138 |

As indicated in the above recipe, Steps 1, 2, 3, 4, and 5 accomplished, respectively: formation of the low-vinyl polybutadiene block, formation of the polystyrene block, formation of the medium-vinyl polybutadiene block, coupling, and hydrogenation. Results from evaluation of the hydrogenated polymers appear in Table V.

TABLE V

| | Properties of Hydrogenated (HLvB/S/HMvB)$_a$Si Block Copolymers | | |
|---|---|---|---|
| Run No. | 27 | 28 | 29 |
| Tensile, psi[1] | | | |
| at 26° C. | 1780[3] | 1105[3] | 755[3] |
| at 70° C. | 440[3] | 250[3] | 160[3] |
| Elongation, %[1] | | | |
| at 26° C. | 590[3] | 520[3] | 500[3] |
| at 70° C. | 395[3] | 200[3] | 100[3] |
| Melt flow[2] | 0 | 0 | 0.1 |
| Permanent set, %[1] | | | |
| at break | 36 | 20 | 44 |
| at 300% elongation | 19 | 12 | 23 |

[1]ASTM D 412-66.
[2]ASTM D 1238 (g./10 min. at 200° C./21.6 kg).
[3]Samples were difficult to mold, and stress cracks were evident, which likely caused tensile values to appear lower than would be properly indicative or representative of these test specimens.

The green tensile values establish that the inventive polymers are desirable thermoplastic elastomers. It will be noted from the data in Table V that tensile strength declines as styrene content is decreased, and that this effect occurs in the face of an increased hydrogenated low-vinyl polybutadiene content. Green tensile values given illustrate that the polymers prepared in accordance with the invention are useful thermoplastic elastomers.

EXAMPLE IV

Several $(HLvB—HMvB)_aZ$ radial block copolymers were prepared in accordance with the following recipe. Value of $a$ is believed to be effectively from 3 to 4 in view of the conditions employed. The coupling agent employed in these runs was diethyloxalate.

| Recipe[1] | |
|---|---|
| Step 1 | |
| Cyclohexane, phm | 390 |
| 1,3-Butadiene, phm | 50 |
| sec-Butyllithium, mhm | 2 |
| ° C. | 70 |
| Hrs. | 1 |
| Step 2[2] | |
| Cyclohexane, phm | 390 |
| 1,3-Butadiene, phm | 50 |
| Tetrahydrofuran, phm | 8 |
| ° C. | 70 |
| Hrs. | 0.5 |
| Step 3 | |
| Diethyloxalate, mhm | |
| Run 30 | 0.4 |
| Run 31 | 0.5 |
| Run 32 | 0.63 |
| ° C. | 70 |
| Hrs. | 0.5 |
| Step 4 | |
| Catalyst[3], mhm | 5 |
| ° C. | 70 |
| Hrs. | 2 |
| Hydrogen pressure, psig | 50 |

[1]General charge order was the order of listing in the recipe.
[2]Step 2 reagents mixed and added to Step 1 reaction mixture.
[3]Step 4 catalyst for hydrogenation was preformed as described in footnote (b) to the Recipe given in Example III.

The recipe describes the formation in Step 1 of the low-vinyl polybutadiene block, the formation thereonto in Step 2 of the medium-vinyl polybutadiene block, coupling in Step 3, and hydrogenation in Step 4. Results of evaluation of the hydrogenated radial block polymers $(HLvB—HMvB)_aZ$ are shown in Table VI.

TABLE IV

| Run No. | 30 | 31 | 32 |
|---|---|---|---|
| Step 1 | | | |
| trans | 51.3 | 51.3 | 51.3 |
| vinyl | 9.1 | 9.1 | 9.1 |
| I.V. | 0.51 | 0.51 | 0.51 |
| $M_w \times 10^{-3}$ | 29 | 29 | 29 |
| $M_n \times 10^{-3}$ | 25 | 25 | 25 |
| Step 2 | | | |
| trans | 10.2 | 10.2 | 10.2 |
| vinyl[1] | 72 | 72 | 72 |
| I.V. | 0.83 | 0.83 | 0.83 |
| $M_w \times 10^{-3}$ | 58 | 58 | 58 |
| $M_n \times 10^{-3}$ | 47 | 47 | 47 |
| Step 3 | | | |
| I.V. | 1.25 | 1.21 | 1.25 |
| $M_w \times 10^{-3}$ | 157 | 156 | 153 |
| $M_n \times 10^{-3}$ | 87 | 82 | 81 |
| Step 4 | | | |
| Tensile, psi | 1600 | 1900 | 1700 |
| Elongation, % | 1200 | 1250 | 1250 |
| Permanent set at break[2] | 500 | 550 | 550 |

[1]These are normalized values. Refer discussion in footnote (e) to Table II.
[2]Reason for high values here are not definitely known, but may be associated with the high percent vinyl content of the medium vinyl block. Hydrogenation of lower vinyl blocks gives a more plastic block.

All polymers of Runs 30–32 were rubbery. These hydrogenated radial block polymers of the type $(HLvB—HMvB)_aZ$ exhibited good tensile and elongation characteristics, and show the desirability of our invention employing a coupling agent of the multiester type.

The disclosure, including data, illustrate the value and effectiveness of our invention. The examples, the knowledge and background of the field of the invention and general principles of chemistry and other applicable sciences, have formed the bases from which the broad descriptions of the invention including the ranges of conditions and the generic conditions of operant components have been developed, which have formed the bases for our claims here appended.

What is claimed is:

1. A hydrogenated radial block polymer represented by the formula $(HLvB—HMvB)_aZ$ wherein each HLvB represents a block of hydrogenated low vinyl polybutadiene, each HMvB represents a block of hydrogenated medium vinyl polybutadiene, Z represents a residue from the coupling agent employed in the preparation of said radial block polymer, and $a$ represents the degree of branching and is at least about 3, wherein prior to hydrogenation the vinyl content of said low vinyl block is in the range of about 6 to 20 weight percent, and the vinyl content of said medium vinyl block is in the range of about 20 to 90 weight percent and is substantially higher than the vinyl content of said low vinyl block.

2. The hydrogenated radial block polymer according to claim 1 wherein the molecular weight range of said hydrogenated radial block polymer is about 50,000 to 750,000.

3. The hydrogenated radial block polymer according to claim 1 wherein the vinyl content of said medium vinyl block is at least 5 units greater than that of said low vinyl block.

4. The hydrogenated radial block polymer according to claim 2 wherein the molecular weight is in the range of about 80,000 to 300,000.

5. The hydrogenated radial block copolymers according to claim 1 wherein Z represents a coupling agent residue derived from a multivinyl aromatic compound, multiepoxide, multiester, multiketone, multialdehyde, multiimine, multiisocyanate, multianhydride, multihalide, or diester of a monohydric alcohol with a dicarboxylic acid.

6. The hydrogenated radial block polymer according to claim 5 wherein said coupling agent residue is derived from a silicon multihalide.

7. The hydrogenated radial block polymer according to claim 1 wherein the molecular weight $M_w$ of said radial block polymer is in the range of about 175,000 to 250,000.

8. The hydrogenated radial block polymer according to claim 3 wherein prior to hydrogenation each block of HLvB represents a vinyl content of between about 6 and 12 weight percent, and each block of HMvB represents a vinyl content of between about 35 and 75 weight percent; the HLvB blocks represent between about 30 and 50 weight percent of the radial polymer; the molecular weight of said radial polymer is in the range of about 80,000 to 300,000; and Z is a residue from a coupling agent which is silicon tetrahalide or diethyloxalate.

9. A process for preparing the hydrogenated radial block polymer as defined by claim 1 which comprises the steps of:

polymerizing butadiene under solution polymerization conditions including temperature and pressure with a monolithium initiator under low vinyl conditions, thereby forming a first block of low vinyl polybutadiene-lithium moiety, polymerizing thereonto butadiene under solution polymerization conditions of temperature and pressure in the further presence of an effective amount of a vinyl-promoter, thereby forming onto said first block a block of medium vinyl polybutadiene wherein the vinyl content thereof is substantially greater than the vinyl content of said low-vinyl block, thereby preparing a second polymer-lithium moiety, treating said second polymer-lithium moiety with a polyfunctional treating agent with a functionality of at least three thereby forming a branched radial polymer, hydrogenating said branched radial polymer under hydrogenation conditions effective to substantially saturate olefinic double bonds, thereby preparing said hydrogenated radial block polymer.

10. The process according to claim 9 wherein said vinyl promoter is an ether or amine.

11. The process according to claim 10 wherein said vinyl promoter is tetrahydrofuran, 1,2-dimethoxyethane, dimethyl ether, diethyl ether, methyl ethyl ether, ethyl propyl ether, di-n-propyl ether, di-n-octyl ether, anisole, dibenzyl ether, diphenyl ether, dimethylethylamine, tri-n-propylamine, tri-n-butylamine, trimethylamine, triethylamine, N,N-dimethylaniline, N-ethylpiperidine, N-methyl-N-ethylaniline, N-methylmorpholine, or N,N,N',N'-tetramethylethylenediamine.

12. A process for preparing a hydrogenated radial block copolymer which comprises the steps of:

polymerizing butadiene under solution polymerization conditions including temperature and pressure with a monolithium initiator under low vinyl conditions, thereby forming a low vinyl block of polybutadiene-lithium moiety represented by LvB—Li, polymerizing thereonto further butadiene under solution polymerization conditions of temperature and pressure in the further presence of an effective amount of a vinyl-promoter to form a medium vinyl block of polybutadiene and thereby preparing a second polymer lithium moiety represented by LvB—MvB—Li wherein the vinyl content of said low vinyl block represents a vinyl content in the range of about 6 to 20 weight per cent and the vinyl content of said medium vinyl block is in the range of about 20 to 90 weight per cent and is substantially greater than the vinyl content of said low vinyl block, treating said second polymer lithium moiety with a polyfunctional treating agent thereby forming a branched radial polymer represented by (LvB—MvB)$_a$Z wherein Z represents the treating agent residue and $a$ represents the degree of branching which is at least about three, hydrogenating said branched radial polymer under hydrogenation conditions effective to substantially saturate olefinic double bonds, thereby preparing a hydrogenated radial block copolymer represented by (HLvB—HMvB)$_a$Z.

13. The process according to claim 12 wherein each block of LvB represents a vinyl content of about 6 to 12 weight percent; each block of MvB represents a vinyl content of about 35 and 75 weight percent; the total LvB blocks represent about 35 to 55 weight percent of said radial polymer; Z is silicon; and the weight average molecular weight of said hydrogenated radial polymer is in the range of about 50,000 to 750,000.

14. The process according to claim 12 wherein Z is silicon or a residue from diethyl oxalate.

15. The process according to claim 9 wherein said low vinyl polybutadiene blocks represent a vinyl content in the range of about 6 to 12 weight percent, and wherein said medium vinyl blocks represent a vinyl content in the range of about 35 to 75 weight percent, based on total butadiene-derived blocks.

16. The process according to claim 12 wherein each said block of low vinyl polybutadiene represents a vinyl content in the area of about 6 to 12 weight percent, and wherein the vinyl content of said medium vinyl block is in the range of about 35 to 75 weight percent.

17. The hydrogenated block polymer according to claim 1 wherein the relative block length of each HLvB block is about 35 to 55, and of each HMvB block is about 65 to 45, and wherein the weight average molecular weight of said radial block polymer is in the range of about 80,000 to 300,000.

18. The process according to claim 12 wherein Z represents a coupling agent residue derived from a multivinyl aromatic compound, multiepoxide, multiester, multiketone, multialdehyde, multiimine, multiisocyanate, multianhydride, multihalide, or diester of a monohydric alcohol with a dicarboxylic acid.

19. The hydrogenated block polymers according to claim 1 wherein said Z is silicon.

20. The process according to claim 18 wherein said coupling agent is silicon multihalide and is silicon tetrachloride.

21. The process according to claim 12 wherein said polyfunctional treating agent is a diester of a monohydric alcohol with a dicarboxylic acid.

22. The process according to claim 21 wherein said diester is dimethyl oxalate, dipropyl malonate, dihexyl pimelate, diethyl adipate, dimethyl phthalate, diethyl oxalate, dibutyl glutarate, dimethyl adipate, dioctyl sebacate, or diethyl terephthalate.

* * * * *